US009272426B2

(12) United States Patent  (10) Patent No.: US 9,272,426 B2
Morris et al.  (45) Date of Patent: Mar. 1, 2016

(54) OPTICALLY-ACTUATED MECHANICAL DEVICES

(71) Applicant: U.S. Army Research Laboratory ATTN: RDRL-LOC-I, Adelphi, MD (US)

(72) Inventors: Christopher J. Morris, Silver Spring, MD (US); Kate E. Malachowski, Silver Spring, MD (US); David H. Gracias, Baltimore, MD (US); Madan Dubey, South River, NJ (US)

(73) Assignee: The Uniteed States of America as represented by the Secretary of the Army, Washington, DC (US)

( * ) Notice: Subject to any disclaimer, the term of this patent is extended or adjusted under 35 U.S.C. 154(b) by 37 days.

(21) Appl. No.: 14/314,875

(22) Filed: Jun. 25, 2014

(65) Prior Publication Data

US 2015/0298322 A1  Oct. 22, 2015

Related U.S. Application Data

(60) Provisional application No. 61/839,572, filed on Jun. 26, 2013.

(51) Int. Cl.
*B25J 15/12* (2006.01)
*B25J 15/10* (2006.01)
*B25J 7/00* (2006.01)

(52) U.S. Cl.
CPC .. *B25J 15/12* (2013.01); *B25J 7/00* (2013.01); *B25J 15/10* (2013.01)

(58) Field of Classification Search
None
See application file for complete search history.

(56) References Cited

U.S. PATENT DOCUMENTS

| 7,483,197 | B2 * | 1/2009 | Miles | G01L 5/0047 359/290 |
| 8,405,899 | B2 * | 3/2013 | Chui | G02B 26/001 359/223.1 |
| 8,703,073 | B2 | 4/2014 | Gracias et al. | |
| 2010/0326071 | A1 | 12/2010 | Gracias et al. | |
| 2012/0285937 | A1 | 11/2012 | Birnbaum et al. | |

OTHER PUBLICATIONS

E. Gultepe, J. S. Randhawa, S. Kadam, S. Yamanaka, F. M. Selaru, E. J. Shin, A. N. Kalloo, and D. H. Gracias, "Biopsy with thermally-responsive untethered microtools," Advanced Materials, vol. 25, No. 4, pp. 514-519, 2013.

(Continued)

*Primary Examiner* — Seahvosh Nikmanesh
(74) *Attorney, Agent, or Firm* — Eric Brett Compton

(57) ABSTRACT

According to embodiments, an optically-actuated mechanical device comprises at least one deformable section formed of: an element including an intrinsic stress differential or gradient, the stress tending to urge deformation of one portion relative to another portion; and an optically-sensitive material which is configured to (i) initially prevent deformation of the device, and (ii) upon sufficient heating by absorbing optical energy allows the element to deform. The devices may be incorporated into various devices and apparatuses for select, non-contact actuation using only optical energy, for example, via light, from one or more lasers. Methods for fabricating and actuating such devices are also disclosed.

22 Claims, 14 Drawing Sheets

(56) References Cited

OTHER PUBLICATIONS

"Is it Art or Science? Microstructures fold under a little light." ARL Public Affairs, Jan. 2, 2013(Available online at: http://www.arl.anny.mil/www/default.cfm?page=I539) (article reprinted as "Microstructures fold under a beam of light to make useful 3-D devices," U.S. Army RDECOM Insider, Feb. 2013, Issue 8.).

Morris, C. J., "Modeling Optical Absorption for Heat-Induced Actuation of Single-Use Microgrippers," ARL-TR-6063, Jul. 2012.

Laflin, K. E., Morris, C. J., Muqeem, T. & Gracias, D. H. (2012), "Laser triggered sequential folding of microstructures", Appl. Phys. Lett. 101(13), 131901.

Liu, Y., Boyles, J. K., Genzer, J. & Dickey, M.D. (2012), "Self-folding of polymer sheets using local light absorption", Soft Matter 8, 1764-1769.

Morris, C. J., Laflin, K. E., Churaman, W. A., Becker, C. R., Currano, L. J. & Gracias, D. H. (2012), Initiation of nanoporous energetic silicon by optically-triggered, residual stress powered microactuators, in "Proc. 25th IEEE International Conference on MEMS", Paris, France, pp. 1245-1248.

Harazim, S.M., Xi, W., Schmidt, C. K., Sanchez, S. & Schmidt, 0. G. (2012), "Fabrication and applications of large arrays of multifunctional rolled-up SiO/SiO2 microtubes", J Mater. Chem. 22(7), 2878-2884.

Laflin, K., Morris, C. J., Bassik, N., Jamal, M. & Gracias, D. H. (2011), "Tetherless microgrippers with transponder tags", J Microelectromech. Sys. 20(2), 505-511.

Bassik, N., Brafman, A., Zarafshar, A. M., Jamal, M., Luvsanjav, D., Selaru, F. M. & Gracias, D. H. (2010), "Enzymatically triggered actuation of miniaturized tools", JAm. Chem. Soc. 132(46), 16314-16317.

Hawkes, E., An, B., Benbernou, N. M., Tanaka, H., Kim, S., Demaine, E. D., Rus, D. & Wood, R. J. (2010), "Programmable matter by folding", Proc. Nat/. Acad. Sci. 107(28), 12441-12445.

Leong, T. G., Randall, C. L., Benson, B. R., Bassik, N., Stern, G. M. & Gracias, D. H. (2009), "Tetherless thermobiochemically actuated microgrippers", Proc. Natl. Acad. Sci. 106(3), 703-708.

Randhawa, J. S. et al., "Pick-and-place using chemically actuated microgrippers," J Am Chem Soc. Dec. 24, 2008;130 (51):17238-9.

Yang, L., Setyowati, K., Li, A, Gong, S. & Chen, J. (2008), "Reversible infrared actuation of carbon nanotube-liquid crystalline elastomer nanocomposites", Adv. Mater. 20(12), 2271-2275.

Lu, S. & Panchapakesan, B. (2006), "Nanotube micro-optomechanical actuators", Appl. Phys. Lett. 88(25), 253107.

Ahir, S. V., Squires, A.M., Tajbakhsh, A. R. & Terentjev, E. M. (2006), "Infrared actuation in aligned polymer-nanotube composites", Phys. Rev. B 73, 085420.

G. P. Nikishkov, "Curvature estimation for multilayer hinged structures with initial strains," J. Appl. Phys., vol. 94, No. 8, pp. 5333-5336, 2003.

Yu, Y., Nakano, M. & Ikeda, T. (2003), "Directed bending of a polymer film by light", Nature 425, 145.

* cited by examiner

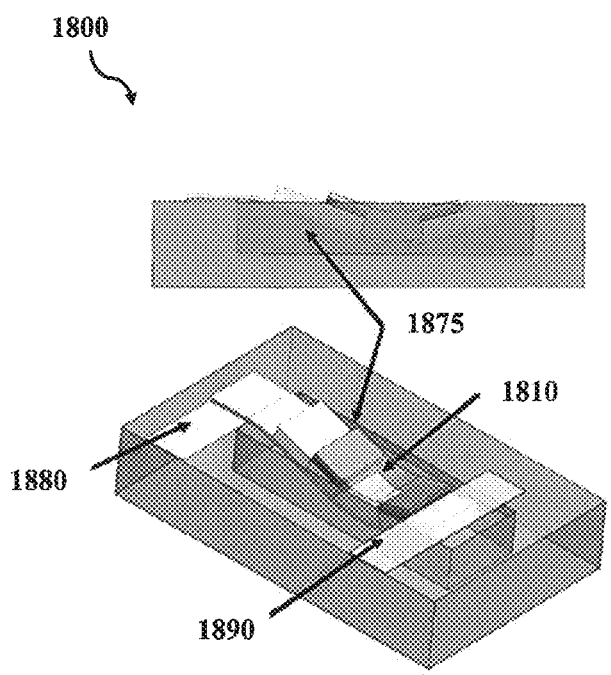
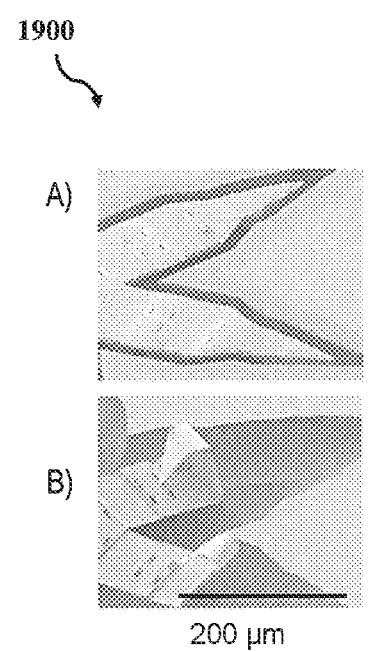
FIGURE 18
FIGURE 19

OPTICALLY-ACTUATED MECHANICAL DEVICES

RELATED APPLICATION(S)

This application claims the benefit of U.S. Provisional Patent Application No. 61/839,572 filed on Jun. 26, 2013, which is herein incorporated by reference in its entirety for all purposes.

GOVERNMENT INTEREST

Governmental Interest—The invention described herein may be manufactured, used and licensed by or for the U.S. Government. Funding of research underlying the innovative technology of this invention came, at least in part, from Contract No. W911NF-09-2-0065.

FIELD OF INVENTION

Embodiments of the present invention generally relate to micro-mechanical actuator devices, such as MEMS, and more particularly to optically-actuated mechanical devices and the actuation thereof.

BACKGROUND

Micro-electrical-mechanical systems (MEMS) have been incorporated into many systems, for various civilian and military applications. Many MEMS actuators use direct electrical, pneumatic, or fluidic actuation. These direct actuation means, however, require large, bulky modules, which can be difficult to integrate within micro-systems, such as batteries or power supplies. Photovoltaic cells are used for optical-to-electrical energy conversion. However, voltage outputs are typically low, and overall photovoltaic optical-to-electrical conversion efficiencies are typically very low (e.g., 10%, up to 22% for specific wavelengths, and over 40% for cooled, multi-junction, commercial research cells).

Electromagnetic power transfer via radio frequency (RF) energy has been used an alternative to wires, pneumatic lines, or other tethers to the system. But, these systems have shown low efficiency of RF power transfer due to the small-sized antennas which must be with micro-systems. Additionally, thermal or chemical activation mechanisms also have been proposed as alternatives, but these have not been found to be readily controlled in a practical manner.

Researchers have demonstrated direct optical-to-mechanical wireless actuation schemes. For example, some have used polymer/carbon nanotube (CNT) composites which exploit the absorption characteristics of CNTs to cause a conformal change and significant strain therein as a result of a thermal expansion coefficient mismatch. Polarized light has been used to interact with liquid crystal elastomeric films which exhibit localized cross-linking or other phase changes leading to mechanical shrinkage, and which can be reversed by irradiating with light of a different wavelength. Non-polarized light has also been shown to cause localized shrinkage of shape memory polymers, such as pre-stressed polystyrene, through patterning of an optically absorbing material. And selective laser ablation of indium-tin oxide films has been used to form interesting folded structures controlled by laser positioning and fluence.

However, each of these conventional examples of optical actuation may be characterized as requiring either high irradiance levels (e.g., >1 W/cm$^2$), long actuation times (10's to 100's of seconds), bulk films and/or materials which are not readily amenable to lithographic patterning and micro-fabrication.

BRIEF SUMMARY OF THE INVENTION

Various embodiments of the present invention are directed to optically-actuated mechanical devices and actuation thereof. According to embodiments, an optically-actuated mechanical device comprises at least one deformable section formed of: an element including an intrinsic stress differential or gradient, the stress tending to urge deformation of one portion relative to another portion; and an optically-sensitive material which is configured to (i) initially prevent deformation of the device, and (ii) upon sufficient heating by absorbing optical energy allows the element to deform. The element may be comprised of a single layer having a surface treatment to create residual stress in the element. Alternatively, the element may be comprised of a multilayer structure formed of at least two layers having different levels of residual stress to create residual stress in the element.

In some instances, the optically-sensitive material comprises 1) an optically-sensitive polymer which, by absorbing optical energy, softens, and/or 2) a thermally-sensitive shape memory alloy (SMA) which, by absorbing optical energy, heats above its transition temperature causing it to deform. The optically-sensitive polymer is configured to soften with light of a predetermined wavelength. For example, the SMA may comprise a Nitinol alloy. Upon cooling, the optically-sensitive material maintains its configuration.

The devices may further include an optically-absorbing material which, by absorbing optical energy, heats and conductively transfers heat to a thermally-sensitive material. For example, the optically-absorbing material may comprise an optical band-pass filter configured to selectively absorb a specific wavelength. In other implementations, the devices may further comprise one or more rigid elements to prevent deformation of the device where provided. Some embodiments of the optically-actuated mechanical device may comprise both 1) an optically-sensitive polymer which, by absorbing optical energy, softens, and 2) a thermally-sensitive shape memory alloy (SMA) which, by absorbing optical energy, heats above its transition temperature causing it to deform. The optically-sensitive polymer is configured to absorb optical energy and, softens thus permitting the device to deform. And the SMA alloy is configured to absorb optical energy causing to device to transition back to its initial state. For some applications, the devices might further include a substrate which is at least partially releasable and once released permits the element to deform.

The devices may have a plurality of optically absorbing materials which are configured to absorb light at different wavelengths. Different lights sources can be provided for such purpose. Depending of their desired configuration, optically-actuated mechanical devices can be fabricated which enables either non-reversible or reversible mechanical actuation.

The optically-actuated mechanical can be included in a micro-gripper apparatus having at least one deformable arm which includes an optically-actuated mechanical device. For example, the micro-gripper apparatus may comprise a body portion and a plurality of arms provided in a circular arrangement about the body. Also, the optically-actuated mechanical devices can be included in a switch. The switch may be an electrical switch configured to open/close a circuit or a mechanical switch configured to rupture a capsule, for example.

Methods for fabricating and actuating the devices are also disclosed. According to embodiments, a method for fabricating one or more optically-actuated mechanical device may comprises: depositing material forming one or more element of the one or more device on a substrate; patterning to define rigid sections and deformable sections of the one or more device; applying optically-sensitive material at a least the deformable sections of the one or more devices; and at least partially releasing the one or more devices from the substrate. And, according to embodiments, a method for actuating an optically-actuated mechanical device comprises applying optical energy to the device to actuate the device. The optical energy has a wavelength between about 1.4 and 1.8 µm (i.e., "eye-safe" wavelengths in short-wavelength infrared (SWIR) regime). In other instances, the optical energy might have a wavelength between about 450 and 680 nm, or even other wavelengths.

These and other embodiments are further discussed below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. These embodiments are intended to be included within the following description and protected by the accompanying claims.

FIGS. 1-3 show exemplary optically actuated mechanical devices according to embodiments of the invention, where

FIG. 4A shows a bilayer pre-stressed element comprised of two layered, FIG. 4B shows a multilayer pre-stressed element formed of four layers, and FIG. 4C, shows the pre-stressed element formed of a single layer of material.

FIGS. 5-7 show various exemplary optically-actuated mechanical devices which include a shape memory alloy layer according to embodiments of the invention, where

FIG. 12 shows three hypothetical transmittance curves for three color band-pass filter materials, where "A" might represent blue visible light, "B" might represent green visible light, and "C" might represent red visible light. FIG. 13 show how filtering might work. FIG. 13a) shows that by covering a surface with 50% material "A" and 50% material "C", the transmittance curve resulting from the overlap of the two materials dips at wavelength "b. " FIG. 13b) and FIG. 13c) show corresponding notch filter absorber layers designed to actuate wavelengths "c" and "a," respectively. FIG. 14 shows exemplary transmittance curves for blue, green, and red filter materials.

FIGS. 16-19 show various exemplary embodiments of devices/apparatuses which may include optically actuated mechanical devices and their operation. FIG. 16 shows sequentially folding of individual arms of a four-membered structure according to an embodiment. FIG. 17 shows sequentially-folded, nested three-dimensional (3-D) patterned cubes according to an embodiment. FIG. 18 shows a substrate-mounted, optically-actuated electrical switch according to an embodiment. FIG. 19 includes SEM photographs of another optically-actuated mechanical device embodied as a different switch. FIG. 19A shows the device in an initially flat, un-actuated state, whereas FIG. 19B shows the device in a deployed or actuated state.

DESCRIPTION OF THE INVENTION

Figure 1A:
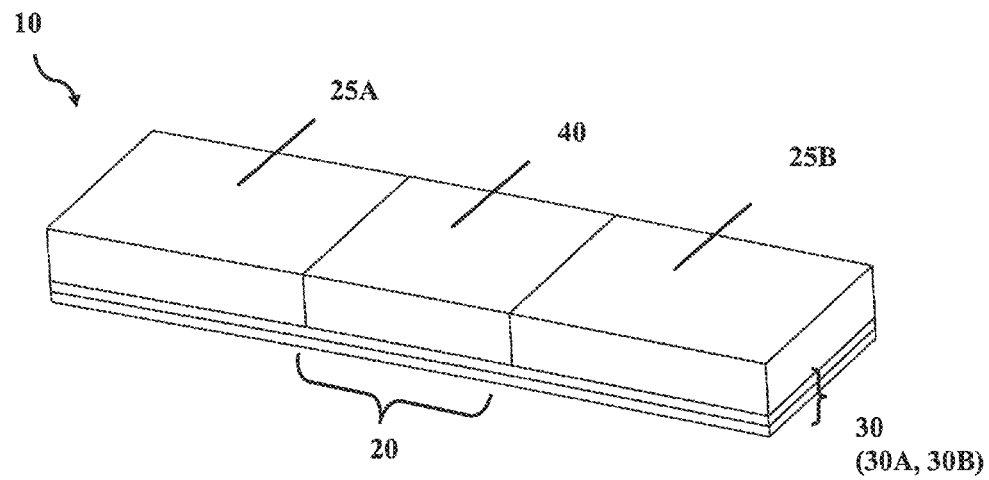
FIGS. 1A, 2A and 3A show schematics of example optically-actuated mechanical devices.

Various optically-actuated mechanical devices are described which are capable of providing mechanical actuation, without the need of any attached batteries, wires, or other tethers. Embodiments of the invention generally address the need to develop new wireless power transfer and new actuation schemes for micro-systems, such as MEMS.

In general, the optically-actuated mechanical devices are configured to be actuated using optical energy. The optical energy includes electromagnetic radiation or light in the optical spectra, which generally include various spectra and sub-bands within ultraviolet (UV), visible (VIS), and/or infrared (IR) light.

The devices include one or more deformable sections which permit deformation of the device in some way, an element effecting that deformation, and optically-sensitive material which when optically-activated by absorbing optical energy enables the deformation.

Upon illumination of the optically-sensitive material (e.g., with light of a specific intensity and/or wavelength), optical energy is absorbed by that material causing it to thermally heat up. This is turn, enables the material to permit deformation. The deformation can include a change in size and/or shape of one or more portions of the device with respect to other portions of the device, via movement. Such movement may include, but is not limited to, rotational DOFs, such as bending, pivoting, flexing, folding, rotating, twisting, or any combination thereof. This may include one or more sections configured as a hinges or to otherwise provide hinge-like motion, such as a flexure mechanism. Deformation may include both elastic and inelastic (e.g., plastic) deformation depending on the design and configuration of the device. Although, in the case of reversible actuation, elastic (non-permanent) deformation may be preferable.

To permit deformation of the device, one or more deformable sections may be included in the device. The deformable sections are adapted to provide a desired level of deformation. For example, various hinge structures can be fabricated to enable a desired degree of freedoms (DOFs), permissible range of possible deformation (such as angular range), initial starting point for deformation, ending point for deformation, etc. It is also possible, to design the hinge structure to have a pre-determined stress-strain characteristic to provide desired flexibility and/or resiliency. A simple hinge structure may permit 1 DOF deformation, such as bending, whereas a more complex hinge structure can permit greater DOFs. Parameters, such as stiffness, the angular extent of bending, start and stop points, etc. may be tailored as desired.

In order to effect deformation of the device via the hinge structure, the optically-actuated mechanical devices include one or more elements effecting that deformation. The element can be judiciously fabricated to include an intrinsic stress differential or gradient with the stress tending to urge deformation of a hinge section.

The optically-actuated mechanical devices further include one of more optically-sensitive materials. As mentioned above, the optically-sensitive material absorbs electromagnetic radiation or light in the optical spectra so as to heat and soften. In some embodiment, optically-sensitive material may include 1) optically-sensitive polymer which soften when they absorb light, and/or 2) optically-sensitive shape memory alloy (SMA) which when heated above its transition temperature causing a conformal change in its shape. Such material and its placement are configured to (i) initially prevent deformation of the pre-stressed element, and (ii) upon sufficient heating by optical absorption, mechanically soften, so as to allow the stressed element to deform the device. Light can provided by an optical energy source, such as a laser, light emitting diode (LED), lamp, or any other source of light, which can be meet the requisite intensity level for heating and actuation. This can include focusing and/or collimation.

The optical intensity which may be needed to achieve activation of the optically-actuated mechanical devices in some embodiments may be as low 0.6 W/cm$^2$, and at typical actuation times of less than about 1 second. Light in the so-called "eye-safe" wavelengths in short-wavelength infrared (SWIR) regime, particularly 1.4 to 3.0 µm, is desirable for actuation, because these wavelengths pass through the cornea and lens and do not focus on the more sensitive retina. In other instances, the optical energy has a wavelength between about 450 and 680 nm. But, it should be appreciated that other devices may be configured to be activated with other wavelengths of optical energy.

More controlled actuation can be achieved via an optical absorber material in some embodiments. Like the optically-sensitive material, the optical absorber material absorbs optical energy. Upon heating, it can transfer heat to the optically-sensitive material. In some embodiments, the optical absorber material may form a band-pass filter or notch filter.

Embodiments of the present invention may be configured for use in micro-systems and/or for micrometer scale applications, such as MEMS, having small features i.e., on the order of about 10$^{-6}$ meters. In actuality, many micro-systems may have linear dimensions which do not exceed a few millimeters on any given side. Most micro-systems functions include some form of mechanical actuation, whether that mechanical actuation is to provide mobility to the system, to provide some mechanical function to the system itself, or to simply control the flow of a limited electrical power budget using mechanical switches. By integrating lower power optical actuation materials and methods into a micro-fabricated device or system, the novel optically-actuated mechanical devices can be applied more generally to micro-systems which are arbitrarily small in size.

By using lithographically patterning techniques to fabricate the micro(meter)-scale devices, this allows many devices to be fabricated in parallel at low cost. One such application is a micro-gripper apparatus. Of course, others-sized devices (whether larger or smaller) are certainly possible as fabrication techniques may enable.

FIGS. 1-3 show exemplary optically actuated mechanical devices according to embodiments of the invention.

Figure 1B:
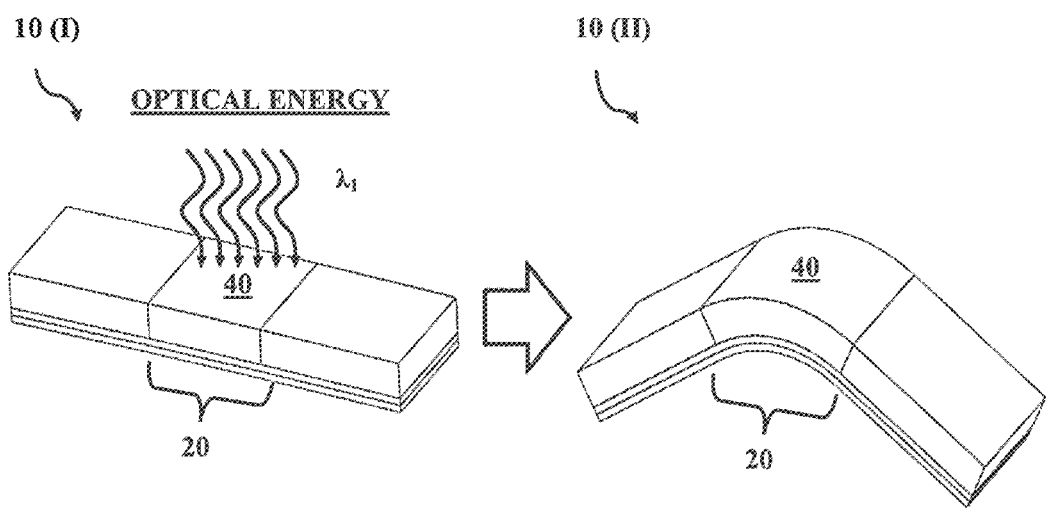
FIGS. 1B, 2B, and 3B show their operation.

FIGS. 1A and 1B show a schematic and operation of an optically actuated mechanical device 10. The device 10 is generally illustrated in FIG. 1A and includes a hinge section 20, one or more rigid sections 25 (25A, 25B), a pre-stressed element 30 and an optically-sensitive material 40. The hinge section 20 enables the deformation of the device 10. Here, the hinge portion 20 enable bending motion as further illustrated in FIG. 1B. Additional, hinge sections may be provided for some applications to enable greater DOFs. Typically, this is non-reversible mechanical actuation.

For exemplary purposes, the device 10 is depicted as a simple beam structure with one hinge section 20 and a pair of rigid sections 25A, 25B. The hinge section 20 can be fabricated as a unitary or multilayered structure with an internal stress differential or gradient. As illustrated, the hinge section 20 is bounded by the rigid sections 25A, 25B, which contain much thicker structural layers and which remain relatively rigid due to a well-known relationship between beam stiffness and layer thickness.

In some embodiments, the hinge section 20 is formed of flexible material which enables deformation. The flexible material may include other elements of the device, such as the pre-stressed element 30, as shown. The rigid sections 25 prohibit deformation of the flexible element and thus by their configuration only allow a portion of the flexible materials to deform. While a pair of rigid sections 25A, 25B is shown in the figures, it will be appreciated that this configuration is not limitation and the other configurations of rigid portions are contemplated. Although, in other embodiments, a separate hinge element may be provided.

The pre-stressed element 30 includes an intrinsic stress differential or gradient such that the stress tends to urge deformation of the hinge portion 20. It may be fabricated as a unitary or multilayered structure as further discussed below with respect to FIGS. 4A-C. To impart a stress differential or gradient into the pre-stressed element 30, multiple ways are possible. In the case of a unitary pre-stressed element 30, it might be formed of a single material, with deposition conditions varied such that different levels of residual stress result between the top and bottom of the film. For larger-scale applications, surface treatments (such as shot-penning, burnishing, and annealing) might be used to impart different stress levels in the top and bottom surfaces of the element 30. Typical stress levels which may be found in the element 30 may be in the range of 100-1000 MPa, for example.

Using a bi-layer or multi-layered stack for the pre-stressed element 30, the level of residual stress which varies between the bottom of the multilayer stack and the top or, between one side and the other within the beam cross-section. The residual stress may be tensile on one side and neutral on the other, compressive on one side and neutral on the other, or tensile on one side and compressive on the other. As shown, the pre-stressed element 30 is a bi-layer structure formed of disparate thin film layers 30A, 30B. The films may be metal or non-metals. The disparate thin film layers are applied upon one another can be used to form a stress differential or gradient formed with the element 30. The thin film layers 30A, 30B may be deposited by thermal evaporation or sputtering, for example The element 30 may be designed according to known design equations for structures with internal stress, such as disclosed by G. P. Nikishkov, "Curvature estimation for multilayer hinged structures with initial strains," *J. Appl. Phys.*, vol. 94, no. 8, pp. 5333-5336, 2003, for instance.

The optically-sensitive material 40 at least partially covers the pre-stressed element 30. It is configured to (i) maintain the stress in the pre-stressed element 30 to prevent deformation, and (ii) upon sufficient heating by optical energy, mechanically softens after passing through a thermal transition state (e.g., glass transition) and allows the pre-stressed element 30 to deform, thus deforming the device 10.

The material 40 may contain, be formed of, or include optical absorbing material, which designed to efficiently absorb light across a spectrum or at a particular wavelength of light. In some embodiments, the optically-sensitive material 40 may be an optically-absorbing thermo-plastic (e.g., thermo-softening-polymer) which becomes pliable or deformable upon absorbing optical energy. One set of material that is of particular interest are photoresists.

The thermo-polymer and optical energy provided may be judiciously tailored to control deformation of the device 10 at a pre-determined wavelength or range thereof. The material 40 may have a narrow wavelength of which it optically absorbs light. By using a polymer which softens at a relatively low temperature (such as 43° C.), the amount of optical energy which must be absorbed can be minimized. One example of a thermo-polymer which softens at 43° C. is SC 1827 photoresist (Microchem Corp., Newton, Mass.), which absorbs most strongly at a wavelength of about 365 nm for use with i-line photolithographic equipment. Another example is a 5:1, by volume, mixture of SC 1805 and SC 1813 (Microchem), which softens below 37° C. (E. Gultepe, J. S. Randhawa, S. Kadam, S. Yamanaka, F. M. Selaru, E. J. Shin, A. N. Kalloo, and D. H. Gracias, "Biopsy with thermally-responsive untethered microtools," *Advanced Materials*, vol. 25, no. 4, pp. 514-519, 2013) and also absorbs most strongly at a wavelength of about 365 nm. It is noted that SC 1827, SC 1805, and SC 1813 are specific product names given to a family of positive photoresist materials, which are generally composed of 65-86% propylene glycol monomethyl ether acetate, 10-30% cresol novolak resin, and 1-10% Diazo Photoactive Compound.

Other color filter materials which transmit certain wavelengths (and thus could be used together to absorb a specific wavelengths) might be used which do not go through a thermal transition phase; rather they cross link and harden as the temperature increases. Possible materials include negative tone photoresists, such as NR5-8000 (Futurrex, Franklin, N.J.), composed of 55-65% cyclohexanone, and 30-40% resins, and 5-100% photosensitizers, and which absorbs most strongly at a wavelength of 365 nm. Other examples include the pigmented photoresists from the Fujifilm Color Mosaic product line, composed of 30-65% 1-Methoxy-2-propanol acetate, 0-30% cyclohexanone, 15-25% Ethyl 3-ethoxypropionate, 0-20% 1-Methoxy-2-propanol, 1-10% Green pigment, 1-10% blue pigment, and 1-10% of a multifunctional acrylic monomer. These materials may be selectively combined and/or engineered to transmit at one of the three primary light colors (450 nm, 532 nm, or 650 nm), and absorb at all other wavelengths in the visible spectrum. Also, other materials which soften at different wavelengths are believed to be available for acquiring or otherwise exist which may be used; the specific wavelengths at which they soften may be publicly reported and/or determinable through routine experimentation.

If different optically-sensitive materials 40 are used in a device, it may be possible to activate a certain hinge structure of the device 10 with one wavelength of light, and another different hinge structure 10 with another wavelength of light.

FIG. 1B shows operation of the optically-actuated mechanical device 10 shown in FIG. 1A. The optically-sensitive material 40 is configured to be initially rigid so as to prevent deformation due to the stress differential or gradient in the pre-stressed element 30 from occurring. When it is illuminated with the optical energy of a predetermined wavelength $\lambda_1$ which the optically-sensitive material 40 is configured to absorb, the optically-sensitive material 40 heats and becomes softer. In this state I, the optically-sensitive material 40, having been softened by absorbing optical energy, can no longer withstand the stress differential or gradient in the pre-stressed element 30. Thus, this stress causes the device 10 to deform in the hinge region 20 into state II. When optical energy is no longer absorbed by the thermo-polymer, it cools and again becomes substantially rigid.

Where possible, alike elements from the above-described embodiments, have been shown with the same reference numerals, and will not be described again below.

Figure 2A:
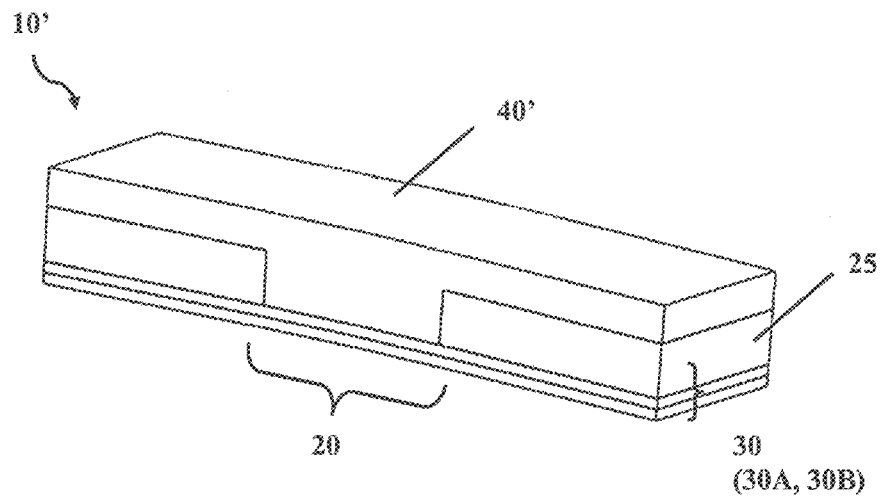
Figure 2B:
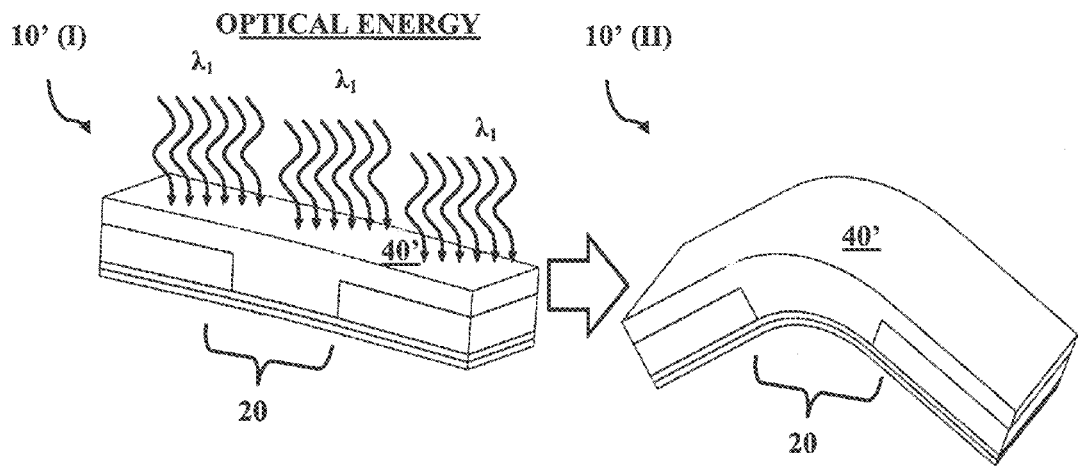

FIGS. 2A and 2B show a schematic and operation of another optically actuated mechanical device 10'. While only the hinge section 20 is shown covered optically-sensitive material 40 in FIG. 1A, in device 10', as shown in FIG. 2A, the optically-sensitive material 40' may extend past the hinge section 20. This configuration provides greater surface area for receiving and absorbing more optical energy of wavelength $\lambda_1$ as shown in FIG. 2B. The absorbed optical energy can conduct as heat to the hinge region 20.

Figure 3A:
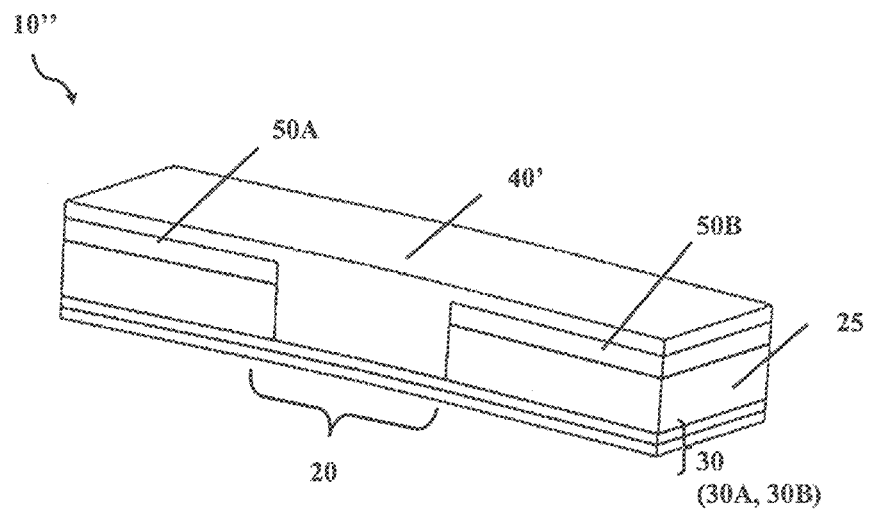
Figure 3B:
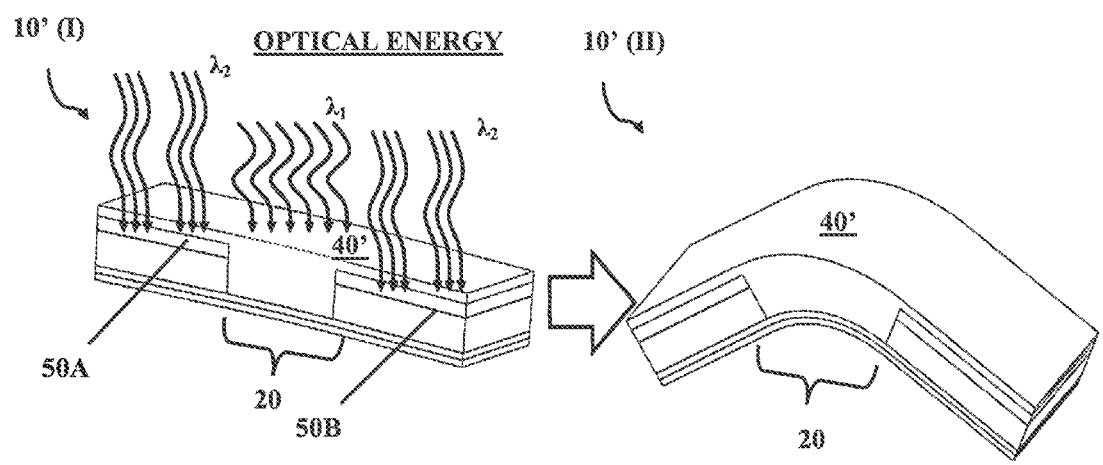

FIGS. 3A and 3B show a schematic and operation of an optically actuated mechanical device 10". As shown in FIG. 3A, device 10" further includes an optical-absorber material 50. The optical-absorber material 50 is may contain, be formed of, or include optical absorbing material, which designed to efficiently absorb light across a spectrum or at a particular wavelength of light. In some instance, it may be similar to optically-sensitive material 40 in some regards, but configured to absorb light of a different wavelength; thus the optically-sensitive material 40 absorbs light of wavelength $\lambda_1$ whereas the optical-absorber material 50 absorbs light of wavelength $\lambda_2$ as shown in FIG. 3B. It, however, does not need to soften, but could just heat up and conduct heat. Many optical absorber materials 50 (such as pigmented photoresists) may harden upon optical heating, rather than soften. Therefore, separate absorber materials 50 may be provided in some embodiments.

While a pair of optical-absorber material 50A, 50B over the rigid sections 25A, 25B is shown covered by the optically-sensitive material 40', it will be appreciated that this configuration is not a limitation and that other configurations are contemplated. For example, in other embodiments, the optically-sensitive material 40 may be covered (partially or fully) by the optical-absorber material 50 in which the optically sensitive material 50 is optically transparent to light of wavelength $\lambda_1$ which can be absorbed by the optically-sensitive material 40. The reverse configuration is also possible.

The optical-absorber material 50 may function as a rigid material itself, such as a pigmented photoresist, and therefore may be patterned over the rigid sections 25A, 25B as shown. The material 50 may also cover the flexible hinge sections 20 as well, and any of the previously described materials or layers (30, 40) may function as the optical absorber including the thermally-sensitive polymer, the rigid section, or hinge section materials. In any case, upon illumination, optical energy is absorbed by the optical absorber layer 50, heating the structure. The thermally sensitive polymer mechanically softens, allowing the stress differential to within the hinge section to bend. The use of one or more patterned optically-absorber materials 50 may provide band-pass filter materials to create wavelength specific optical absorbers, or notch filters.

Advantageously, all elements of the devices 10, 10' and 10" can be lithographically patterned, allowing the apparatus to be used in micrometer or nanometer scale applications, and allowing many copies of the apparatus to be fabricated in parallel at low cost.

Figure 4A:
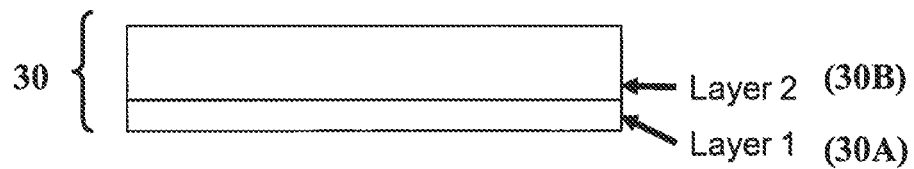
FIG. 4A-4C show examples of pre-stressed element for optically actuated mechanical devices, where
Figure 4B:
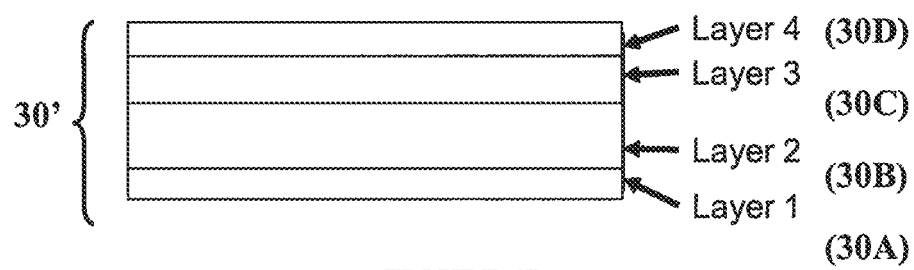
Figure 4C:
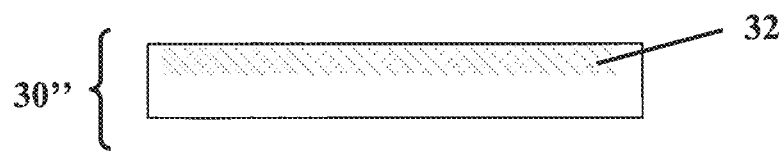

FIGS. 4A-4C show examples of the pre-stressed element 30. In general, the pre-stressed element 30 may be formed on one or more thin layers. FIG. 4A shows a bilayer pre-stressed element 30 comprised of two layers according to an embodiment. For example, Layer 1 (30A) may be formed to have a thickness of approximately 50 nm of a first metal, such as chromium (Cr) and Layer 2 (30B) may be formed to have a thickness of approximately 150 nm of a second metal, such as gold (Au). Evaporated Cr has typical tensile residual stress levels of 0.5 to 1 GPa, while evaporated Au typically exhibits 10-50 MPa. This results in a stress differential in the multilayer element that would tend to bend the element (beam) down towards Layer 1 (30A).

FIG. 4B shows a multilayer pre-stressed element 30' formed of four layers. For example, Layer 1 (30A) and Layer 3 (30C) may be of a first metal (e.g., chromium) and Layer 2 (30B) and Layer 4 (30D) may be of a second metal (e.g., gold). With thicknesses of approximately 3, 100, 50, and 40 nm for Layers 1, 2, 3, and 4 respectively, this element (beam) would tend to bend upward towards Layer 4. By using four or even perhaps more layers, instead of two, may enable the multilayer pre-stressed element 30 to be fabricated to better comply with other fabrication process requirements, such as the need to have Cr on the bottom of a multilayer stack for better adhesion, and Au on the top for protection against oxidization.

Non-metallic materials may also be used for form a multilayer element. For example, bilayer or multilayer structures could also be fabricated from silicon monoxide (SiO) and/or silicon dioxide ($SiO_2$).

In some embodiments, as shown in FIG. 4C, the element 30" might be formed of a single layer of material, with deposition conditions varied such that different levels of residual stress result between the top and/or bottom surfaces of the material For example, an evaporation process using argon (Ar) ion bombardment to deposit nickel (Ni) can be used to produce residual stresses 32 approaching 0.5 GPa, which may be either tensile or compressive depending on the process conditions may be used.

FIGS. 5-7 show various exemplary optically-actuated mechanical devices which include a shape memory alloy layer according to embodiments of the invention.

Figure 5A:
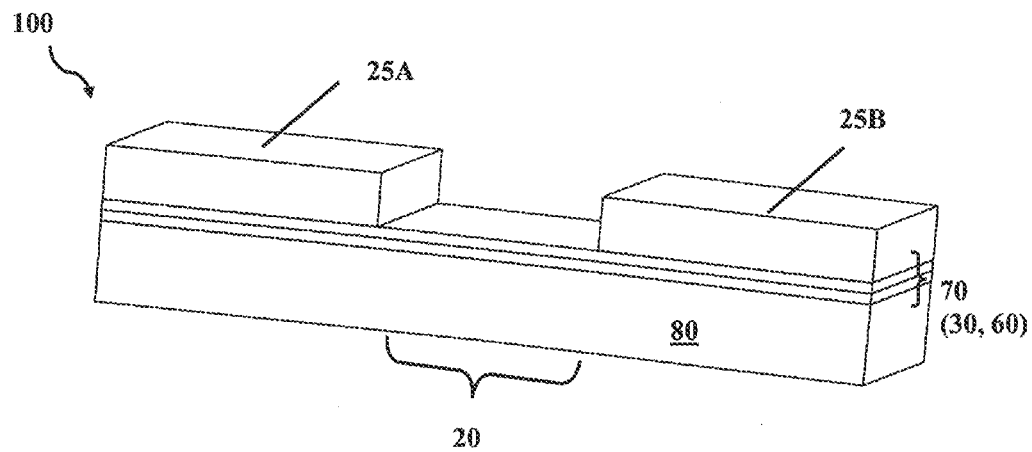
FIGS. 5A, 6A and 7A show schematics of exemplary optically actuated mechanical devices.

FIG. 5 shows a schematic of an optically-actuated mechanical device 100. The device 100 is generally illustrated in FIG. 5A and includes a hinge section 20, one or more rigid sections 25 (25A, 25B), a pre-stressed element 30, a shape memory alloy (SMA) layer 60. In some implementations, the pres-stressed element 30 and the SMA 60 may be formed as a multilayer structure 70.

Where possible, alike elements from the above-described embodiments, have been shown with the same reference numerals, and will not be described again. The device 100 may be fabricated upon a releasable substrate 80. It may be partially or fully releasable. Assuming the substrate 80 partially released, once the movable part of the structure is released, the remaining substrate can be used a handle to "hold on" to the hinge so it can be used, if and where desired.

The device 100 with pre-stressed element 30 includes an internal stress differential or gradient. It may be fabricated from one or more layers as discussed above. Additionally, the device 100 includes a shape memory alloy (SMA) which allows reversible for actuation. The pres-stressed element 30 and the SMA 60 may be fabricated in a multilayered structure with at one layer being a pre-stressed element 30 and at least one layer being a SMA 60. The pre-stressed element 30 may be fabricated from one or more layers as discussed above. The order of the layers of the multilayered may not be critical, and may be reversed, in some embodiments. Advantageously, all elements of the device 100 can be lithographically patterned, allowing the apparatus to be used in micrometer or nanometer scale applications, and allowing many copies of the apparatus to be fabricated in parallel at low cost.

Nitinol is one well-known type of SMA 60 which may be used in some implementations. Nitinol is a trade name for an alloy of nickel and titanium, typically composed of approximately 50 to 51% nickel by atomic percent (app. 55 to 56% weight percent). Nitinol's shape memory properties are derived from a reversible solid-state phase transformation between two different crystal phases. At high temperatures, nitinol assumes a cubic crystal structure referred to as austenite, whereas, at low temperatures, nitinol transforms to a monoclinic crystal structure known as martensite. Nitinol's martensite crystal structure has the ability to undergo limited deformation (app. 6-8%) without permanent deformation. When the martensite is reverted to austenite by heating, the original austenitic structure, and thus the SMA's shape, is restored. The temperature at which austenite transforms to martensite is generally referred to as the transformation temperature. The transition temperature of the alloy can be tailored to transitions between about 25 and 70° C. depending on the alloy composition, for instance. Since the SMA transition temperature occurs at a relatively low temperature, the amount of optical energy which must be absorbed for the transition may be minimized. To fix the original flat shape of the Nitinol, the alloy must be held in position and annealed to a temperature of about 500-550° C. It is noted that shape memory has also been shown, for instance, in gold-cadmium and copper-brass alloys, and these might alloys could also potentially be used.

SMAs are thermally-sensitive materials. In general, heat needed to cause bending in a SMA can come, not only by absorbing light but also from other forms of heat, such as joule heating or heat generated by a chemical reaction. However, in the scope of this invention, absorption of optical energy is primarily being utilized for heating the SMA for bending. And this is what is meant by optically-sensitive for this material.

Figure 5B:
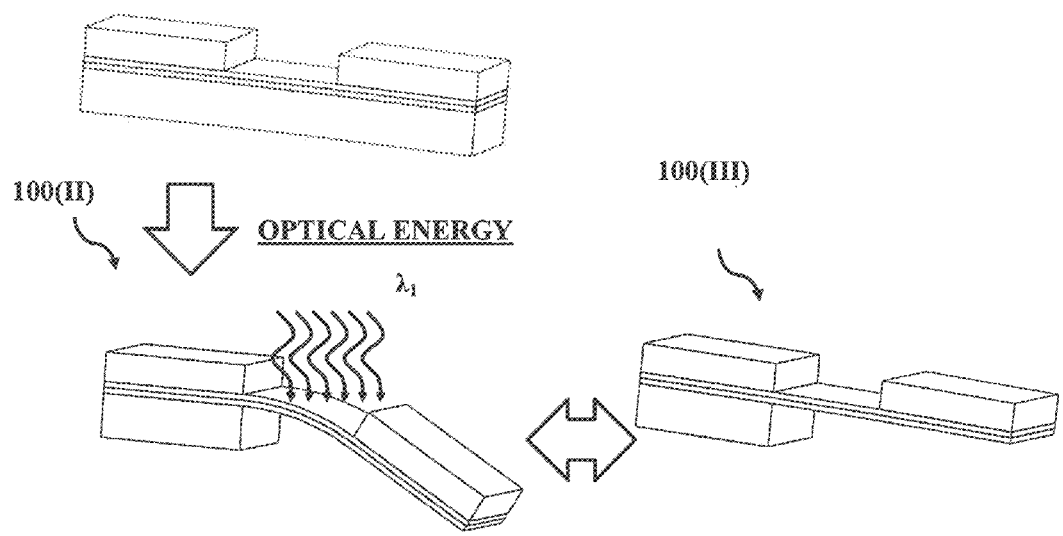
FIGS. 5B, 6B, and 7B show their operation.

FIG. 5B shows operation of the optically-actuated mechanical device 100. In state I, the optically-actuated mechanical device 100 has a planar shape having been fabricated as a multilayered structure with the pre-stressed element 30 and the SMA 60 which have been deposited. The SMA 60 is annealed in a flat configuration. The internal stress differential or gradient of the pre-stressed element 30 urges the entire device 100 to bend. To prevent deformation of the device 100 by the pre-stressed element 30, the device 100 can be held by an external apparatus (such as a clamp) or a releasable substrate 80.

Upon release of the external apparatus or substrate 80, the stress gradient formed by the pre-stressed element 30 bend the structure at the hinge section 20 (in a direction determined by stress gradient) into state II. The depicted bending could also be caused by any other integrated or external force, and would not necessarily have to come from internal stress.

Upon illumination, optical energy is absorbed by the optical absorber layer, heating the SMA 60 above its transition temperature, the SMA 60 overcomes the residual stress differential, gradient, or other integrated or external force to return the SMA 60 to a flat, annealed state III. Upon cooling, the SMA 60 will maintain this configuration.

Metals are generally conductive and have no electronic bandgap; they may absorb light across all spectra. Thus, it is the intensity of optical energy, rather than the specific wavelength of light, which may be of primary importance for a metallic SMA 60.

Figure 6A:
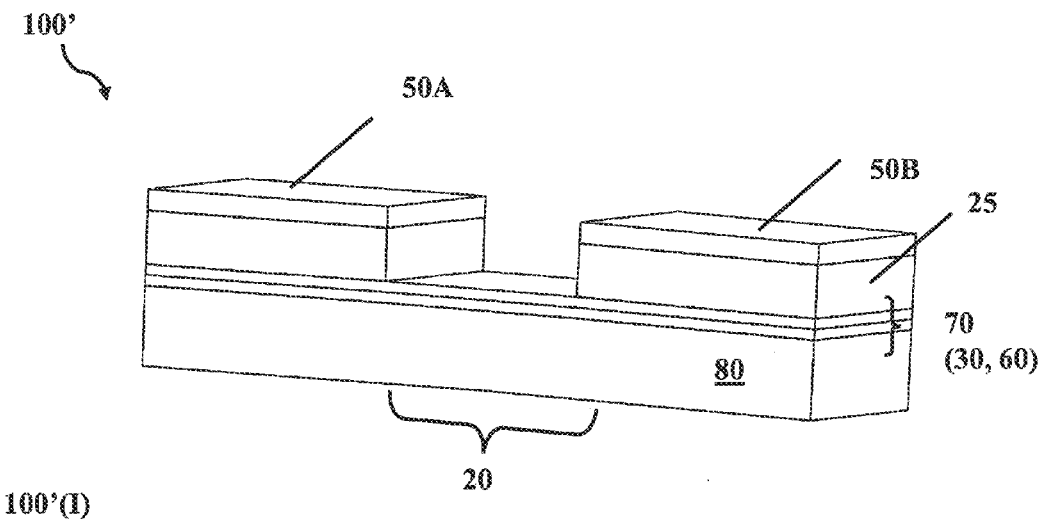
Figure 6B:
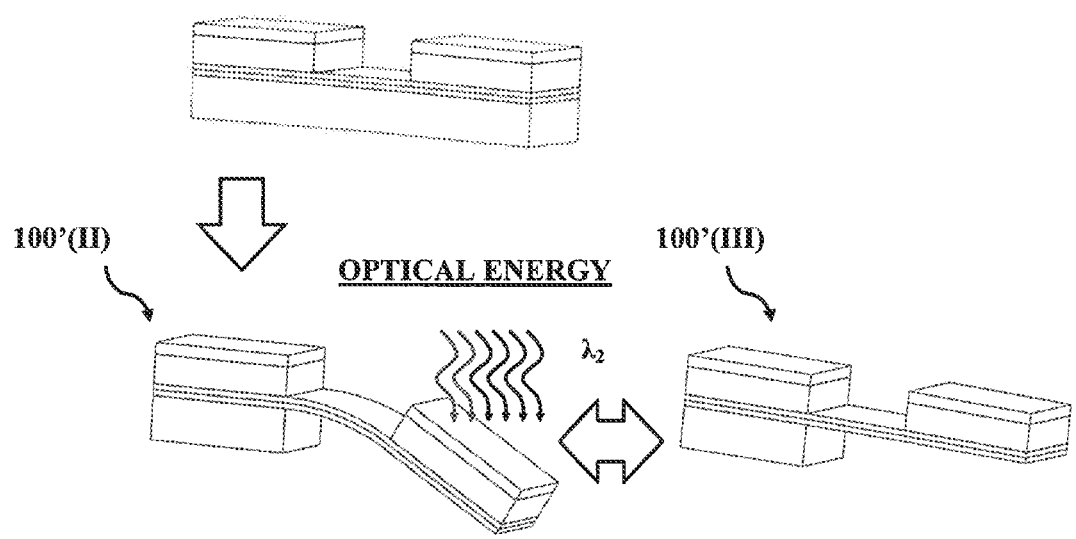

FIGS. 6A and 6B show a schematic and operation of an optically actuated mechanical device 100'. As shown in FIG. 6A, device 10' further includes an optical-absorber material 50. State I is similar to that of the aforementioned embodiment. Optical energy heats the optical-absorber material 50 which absorbs light at a wavelength $\lambda_2$ in state II. The absorbed heat in transferred by conduction to the SMA 60. When sufficient energy is received by the SMA 60 above its transition temperature, the SMA 60 overcomes the residual stress differential, gradient, or other integrated or external force to return the SMA to its a flat, annealed state III. Upon cooling, the SMA 60 will maintain this configuration.

Figure 7A:
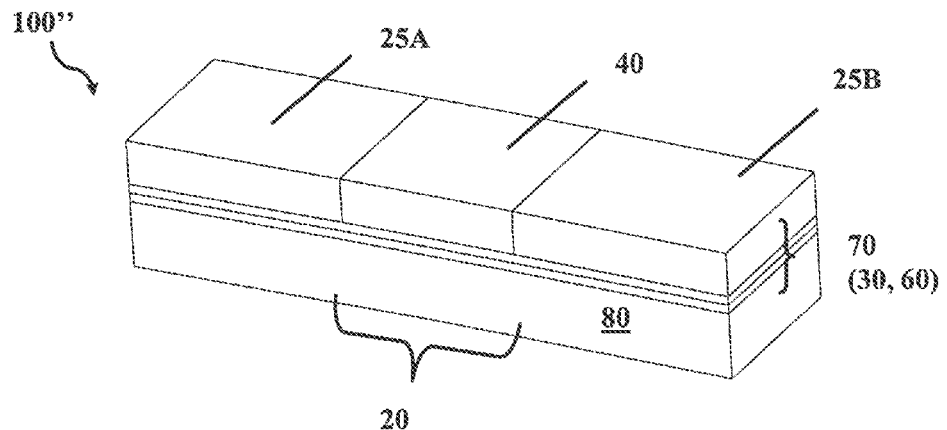
Figure 7B:
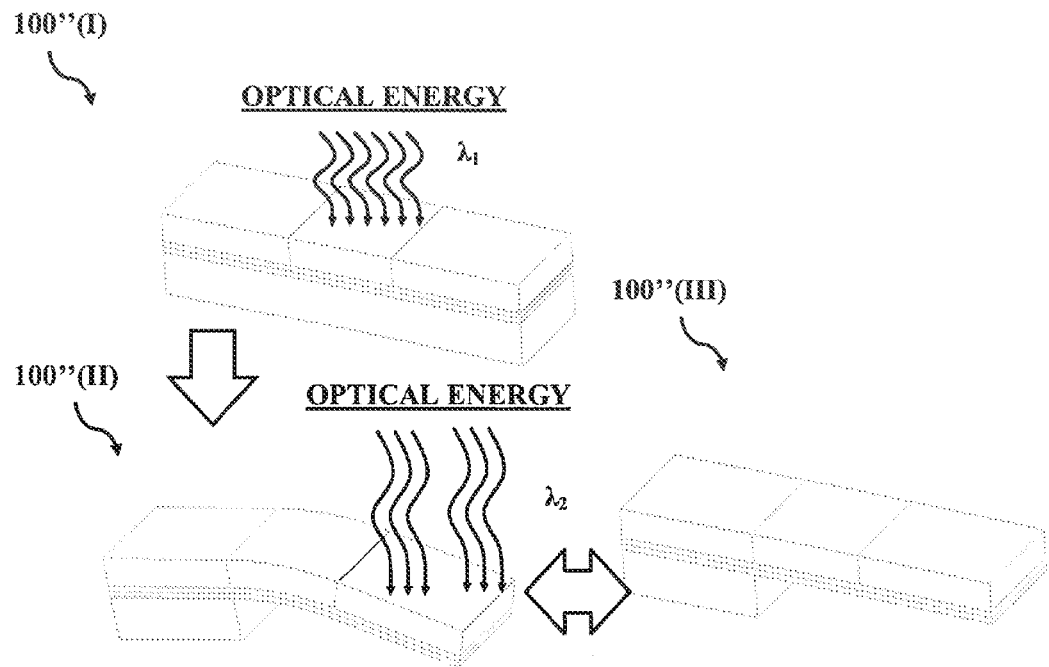

FIGS. 7A and 7B show a schematic and operation of an optically actuated mechanical device 100". As shown in FIG. 7A, device 100''' further includes the optically-sensitive material 40. In some embodiments, the optical-absorber material 50 may be provided along with the optically-sensitive material 40 similar to as shown in FIGS. 3A and 3B.

Some initial optical-heating of the optically-sensitive material 40 at wavelength $\lambda_1$ cause the device 100" to go from state I to state II. So long as the device 100" is designed such the force applied by the stress-layer is greater than the resistance of the SMA to bending, the device 100" will bend when the optically-sensitive material 40 softens. This would be similar to what is shown in FIGS. 1A and 1B.

And if the device 100" is designed so that the transition force of the SMA 60 (when rebounding to its initial flat shape by absorbing light of wavelength $\lambda_2$) is greater than that of both the optically-sensitive material 40 and pre-stressed element 30 it will bent back to a straightened state III. This embodiment could provide more-controlled bending of the hinge for opening and closing.

This arrangement is also more stable because the optically-sensitive material 40 helps stabilize the two states, II and III. If the dynamics of heating and cooling are controlled, one could even build a bi-stable switch, such that the optically-sensitive material 40 "freezes" the structure of the device 100" in the flat state III, but softens just enough when reheated to allow it to bend back to the bent state II. For instance, one wavelength $\lambda_1$ closes the hinge and another wavelength $\lambda_2$ opens it.

The aforementioned embodiments may be fabricated into complex actuator devices as further described. These devices may include micro-grippers, which involve circular arrangements of actuator segments designed to close in on and grip an object positioned near the center of the circular arrangement.

Examples of micro-grippers (which are actuated by different means, other than optical energy), have been previously disclosed by Bassik, N., et al. (2010), "Enzymatically triggered actuation of miniaturized tools," *J Am. Chem. Soc.* 132(46), 16314-16317; Leong, T. G., et al. (2009), "Tetherless thermobiochemically actuated microgrippers," *Proc. Natl. Acad. Sci.* 106(3), 703-708; and Randhawa, J. S. et al., "Pick-and-place using chemically actuated microgrippers," *J Am Chem Soc.* 2008 Dec. 24; 130(51):17238-9, for example. Micro-gippers can be used for micro-scale surgical applications, such a clamp or suture. Moreover, micro-gripper devices and apparatuses utilizing the apparatus may be used to attach small parts, such as micro-transponders, to fibers, textiles, and insects. They also can be configured to mechanically latch onto an object, such as another device, cell, or textured surface. Micro-gripper apparatuses may be produced having similar hinged-capability, but configured to be actuated with optical energy according to embodiments of the present invention.

Figure 8A:
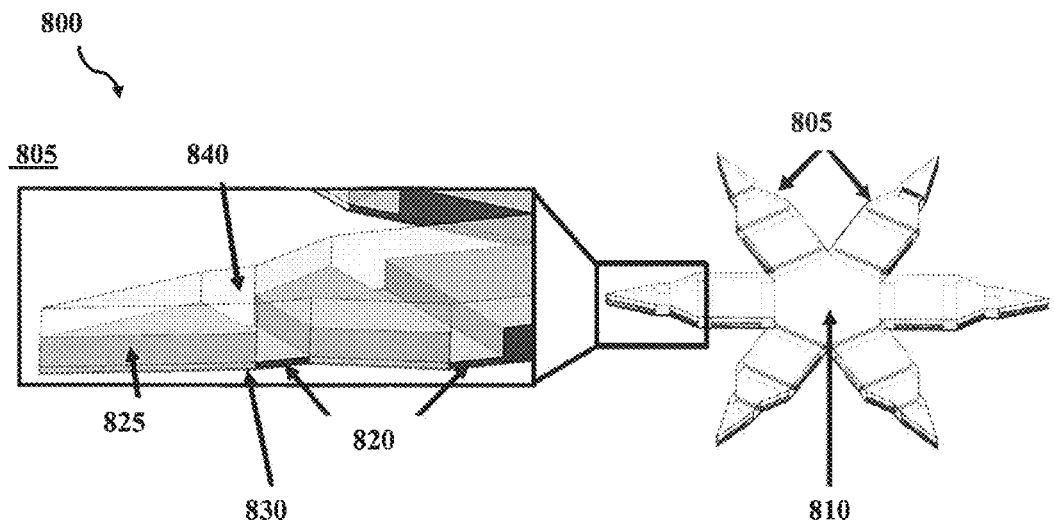
FIG. 8A shows one example of a micro-gripper apparatus according to an embodiment.

FIG. 8A shows one example of a micro-gripper apparatus 800 according to an embodiment. The apparatus 800 includes a circular arrangement of micro-gripper arms 805. Here, the micro-gripper apparatus 800 includes six micro-gripper arms 805 arranged around a rigid body portion 810; although, similar micro-gripper apparatuses can be fabricated have any number of arms and/or configurations. The construction of one of the micro-gripper arms 805 is further illustrated in the detail pane of the figure and includes hinge sections 820, rigid sections 825 and pres-stressed element 830. By judiciously tailoring the hinge sections 820 and rigid sections 825, an apparatus having desired movement potential and degrees-of-freedom can be produced.

As will be appreciated, the micro-gripper arm is an optically actuated mechanical device with the pre-stressed element 830 and optically-sensitive material 840 enabling actuation. The micro-gripper arms 805 can be individually activated or actuated together, for example, by illuminating it with light having a wavelength which the optically-sensitive material 840 is sensitive to and will optically absorb. Initially, the micro-gripper 800 is fabricated to be generally planar, but upon actuation, the micro-gripper arms 805 bend away from the plane of the body 810.

Figure 8B:
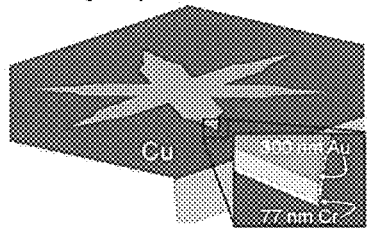
FIG. 8B shows a fabrication process which may be used to create the micro-gripper apparatus of FIG. 8A and other embodiments.
Figure 8B:
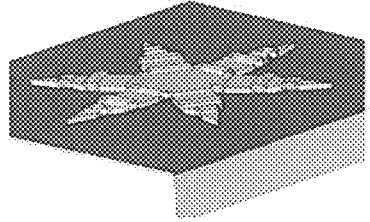
Figure 8B:
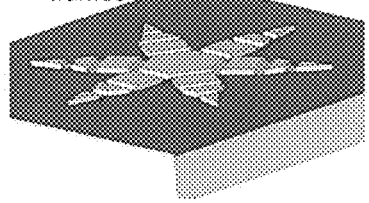
Figure 8B:
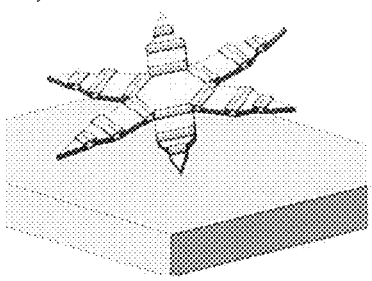

FIG. 8B shows a fabrication process which may be used to create the micro-gripper apparatus of FIG. 8A and other embodiments. Planar photolithographic micro-fabrication processes which are typically used to fabricate conventional micro-electronic devices, such as logic and memory devices, sensors, transponders, optical modules such as light emitting diodes (LEDs) etc. may be used. Advantageously, photolithography enables multiple devices to be fabricated together on the same substrate. In addition, using lithography, the innovative micro-grippers and other devices can be integrated and used with any of these conventional types of devices, systems, and applications.

In step A, on a substrate, a sacrificial a 250 nm Cu layer is thermally evaporated sacrificial layer, a 20 nm Ti adhesion layer, and followed with an evaporated multilayer thin film stack of Cr and Au to provide the pre-stressed element of desired residual stress. In one example, the multilayer thin film stack consisted of 77 nm of Cr and 300 nm of Au. These layers can be patterned by liftoff in a suitable solvent (such as acetone).

Then, in step B, photolithography was used to define rigid section areas, and electro-deposition to fill these areas with a 4 μm thick layer of Au. In step C, a 3 μm thick Shipley 1827 photoresist (Microchem) is patterned over the top of each hinge. Finally, in step D, the sacrificial layer is dissolved in ferric chloride ($FeCl_3$), after the micro-gripper apparatusess are collected and dried. Alternatively, a vapor phase, such as xenon difluoride ($XeF_2$) may be used to release the devices instead of the liquid phase, $FeCl_3$.

Figure 9:
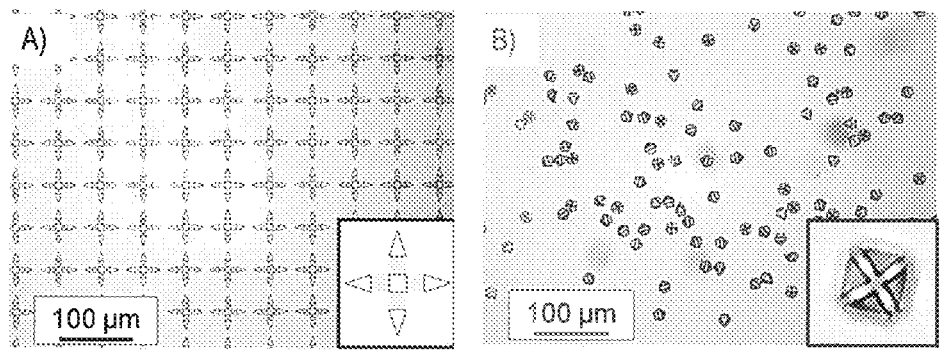
FIG. 9 shows SEM photographs of four-point folding micro-gripper apparatuses where Photograph A shows the unfolded structures as fabricated and Photograph B shows the same structures once fully released and folded.

FIG. 9 shows SEM photographs of four-point folding micro-gripper apparatus composed of silicon dioxide ($SiO_2$) and silicon monoxide (SiO) hinge sections, measuring 50 μm in diameter. Photograph A shows the unfolded $SiO/SiO_2$ hinge sections with thicker $SiO_2$ rigid sections and no thermally-sensitive polymer layer. Photograph B shows the same structures once fully released and folded.

Figure 10:
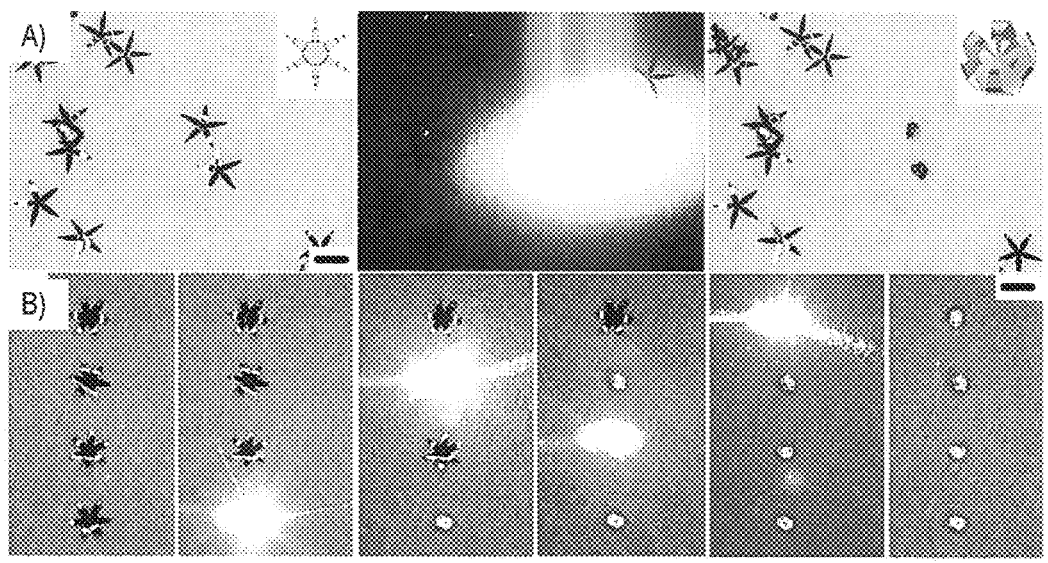
FIG. 10 includes SEM photographs showing various operations of the micro-gripper arms illuminated by a laser.

FIG. 10 includes SEM photographs showing various operations of the micro-gripper arms having 40 μm hinge regions, illuminated by a 532 nm green laser. The photographs in row A show that, with irradiation with a spatially diffuse laser beam, multiple micro-grippers folded and closed at once. The scale bar here is 500 μm. Insets show schematics of open and closed grippers. In contrast, the photographs in row B show that, with a relatively-focused laser irradiation, individual micro-grippers could be folded. The scale bar here is 1 mm. Hence, parallel or individual deployment of these devices can be achieved by selectively controlling illumination.

The actuation behavior of the hinges was characterized by the inventors as a function of laser irradiation by placing different neutral density filters in the path of a 532 nm green laser, coupling that beam into a 400 μm core, 0.37 NA optical fiber, and focusing the light exiting the fiber with a 5 mm diameter, 0.243 NA lens. Holding this lens at an angle between the test sample and a long-working distance microscope objective resulted in a 1.8 mm² elliptical laser spot, focused on the sample. The total beam power was measured exiting the fiber and lens using a Newport photodetector (818-UV) and power meter (1916-C). A high-speed video camera enabled measurement of actuation time for each irradiance level.

Figure 11:
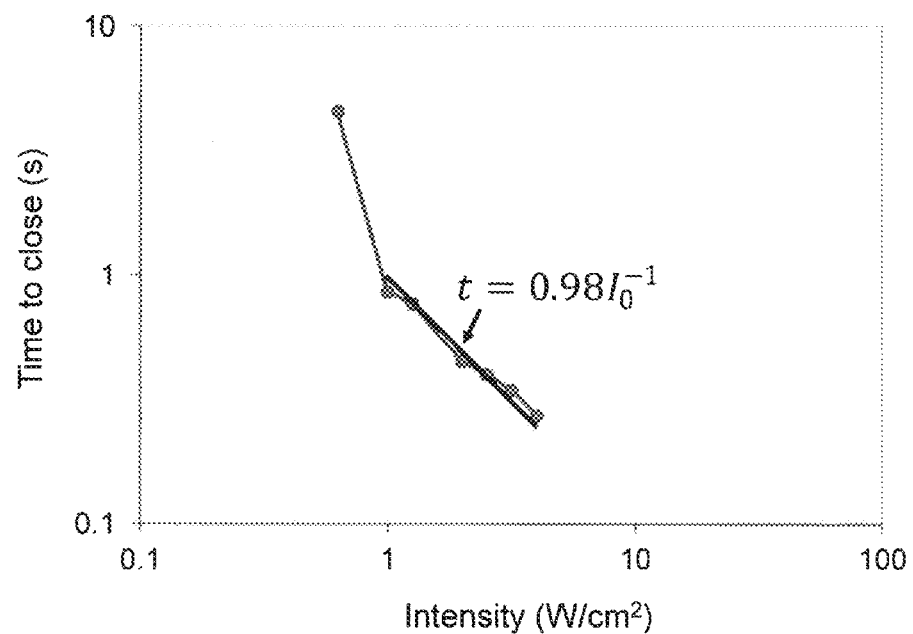
FIG. 11 shows data on three laser irradiance regimes observed.

Three laser irradiance regimes were observed. These are shown in the plot of FIG. 11. There was a threshold irradiance in this particular experiment of 680 mW/cm², below which no folding occurred presumably due to insufficient heating of the device. At intermediate irradiance between 680 mW/cm² and 1000 mW/cm², a small decrease led to significantly slower folding times, likely due to heat loss via convection and conduction to the surrounding air as well as conduction to any substrate below. And, at larger irradiance, an inverse relationship was observed between the time to close and irradiance.

To understand these regimes, the inventors analytically and numerically modeled heat loss from the micro-gripper due to conduction into a surrounding air domain. Although each micro-gripper apparatus was initially planar within a short distance from the microgripper surface, heat loss into the surrounding air rapidly approached that of a point source in spherical coordinates. The micro-gripper surface was approximated from which heat was lost as a sphere with equivalent surface area to obtain a solution for the steady state temperature rise at the surface $\Delta T_s$, $$\Delta T_s = I_0 \frac{R}{k} \frac{f_a}{2\sqrt{2 f_l}} \qquad (1)$$

Here, k is the thermal conductivity of air, $I_0$ is the optical power per unit area absorbed by the micro-gripper, R is the micro-gripper radius, and $f_a$ and $f_l$ are area fill factors relating the actual area of optical power absorption and loss, respectively to the area of a disk of radius R. The transient temperature response was numerically calculated using a two-dimensional axisymmetric model in ANSYS (v13) for a variety of micro-gripper sizes and optical power levels, and consistently found calculated steady state micro-gripper surface temperature changes to be within 7.3% of those predicted by equation (1).

Each transient solution closely followed the exponential relationship $\Delta T \approx \Delta T_s (1-e^{-t/\tau})$, with a time constant τ depending primarily on micro-gripper size. We obtained an expression for the time to close $t_c$ in terms of the closing temperature rise $\Delta T_c$ by rearranging the exponential relationship, expressing the resulting natural logarithm as a Taylor series expansion, dropping all higher order terms for $\Delta T_c \ll \Delta T_s$, and substituting $\Delta T_s$ from equation (1);

$$t_c \approx \tau \Delta T_c \frac{2k\sqrt{2 f_l}}{f_a R I_0} \qquad (2)$$

Assuming that $I_0$ is directly proportional to $I_r$, equation (2) correctly predicts the $1/I_r$ behavior observed at higher laser irradiances. The inventors also used the empirical power law fit for the 532 nm source in FIG. 10, the assumption that $I_0$ was precisely 15% of the applied irradiance, a numerically calculated value for τ, and equation (2) to calculate an average $\Delta T_c$ of 46° C. This result corresponds to an average closing temperature of 69° C. for an initial room temperature of 23° C., which is consistent with past observations of micro-gripper closure between 40 and 95° C. (Leong et al. (2009)). Although more accurate calculations would require a more detailed knowledge of the relationship between $I_0$, and $I_r$, and validation with actual measured values for $\Delta T_c$, the approximated equations (1) and (2) are useful to estimate folding temperatures and times in different environments.

A useful result from equation (2) is the prediction of the lower limit of operation, or the lowest intensity $I_0$ at which actuation can be expected. For the six point folding star depicted in FIG. 7 covered with an optical absorber layer, $f_a = f_l = 0.37$, and from equation (1), $I_0 = 1.2 (\text{mW/cm-K}) \Delta T_s / R$ for operation in air. For $\Delta T_c = \Delta T_S = 20°$ C. and a micro-gripper diameter of 1.4 mm, the minimum irradiance predicted is 343 mW/cm². Although this intensity level is not below the 1 mW/cm² threshold for eye-safe optical sources in the visible wavelength regime, it is below the eye-safe threshold for infrared light sources above 1500 nm in wavelength. The inventors have fabricated micro-gripper apparatuses with optical absorber materials designed to absorb nearly 100% of any incident infrared light, which will be able to operate in an "eye-safe" manner. Tests with a green, 532 nm wavelength absorber resulted in actuation from irradiance levels as low as 465 mW/cm², which will be well under eye-safe limits for a 1500 nm laser source.

Micro-grippers and other devices can be fabricated with optical absorber layers designed to absorb specific wavelengths of light. This approach is described with reference to FIGS. 12 and 13. Most optical filter materials are band-pass filters, which pass light of a particular wavelength and block others.

Figure 12:
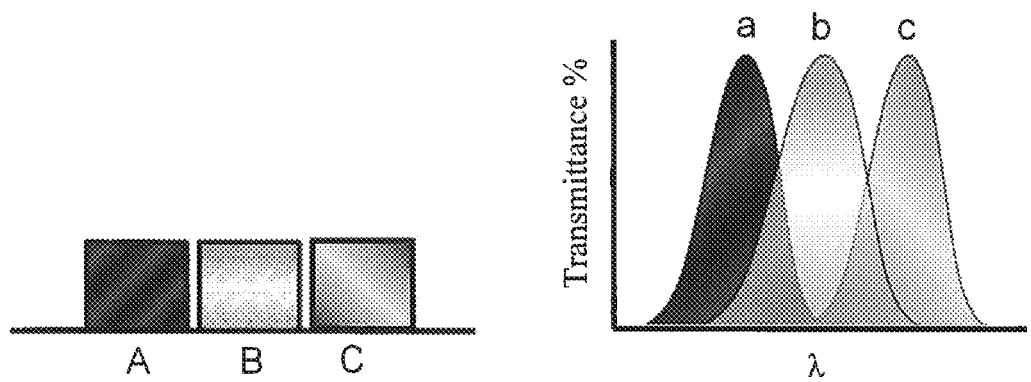
FIGS. 12-14 show examples of optically-absorbing material that comprises an optical band-pass filter configured to selectively absorb a specific wavelength.
Figure 13:
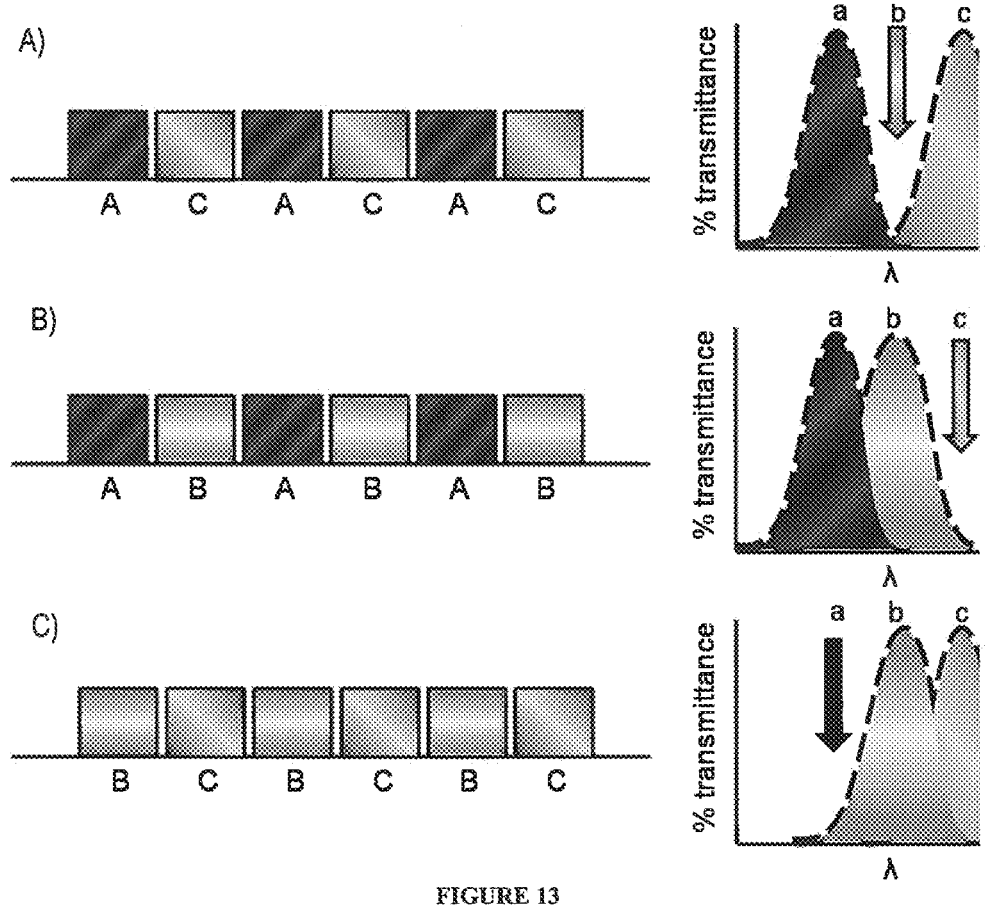

FIG. 12 shows three hypothetical transmittance curves for three color band-pass filter materials, where "A" might represent blue visible light, "B" might represent green visible light, and "C" might represent red visible light. Due to the band-pass nature of each transmittance curve, any one material would pass light of a specific wavelength but absorb all others. In order to create notch filter absorber layer to absorb light of a specific wavelength and transmit all others, one can take advantage of the linear dependence of temperature rise on absorption area according to equation (1).

FIG. 13a) shows that by covering a surface with 50% material "A" and 50% material "C", the transmittance curve resulting from the overlap of the two materials dips at wavelength "b." Light at wavelength "a" will not be absorbed by "A" but will be absorbed by the 50% area covered with material "C," resulting in a 0.5 factor on $f_a$ in equation (1) and therefore 50% of the temperature rise. Light at wavelength "c" will be absorbed by the 50% area covered with material "A," again resulting in a 50% temperature rise. But light at wavelength "b" will be absorbed by the entire absorber area, resulting in the full temperature rise. As long as the actuation threshold is above the 50% temperature rise and below the full temperature rise, the apparatus would actuate only at wavelength "b." FIG. 13b) and FIG. 13c) show corresponding notch filter absorber layers designed to actuate wavelengths "c" and "a," respectively.

Given a set of n band-pass filter materials, designed to pass light at n distinct wavelengths over a certain wavelength range (e.g. the visible range), the factor on $f_a$ in equation (1) and therefore the factor on temperature rise at all undesired actuation wavelengths will be (n−2)/(n−1). Thus, with three distinct filter materials, the temperature rise at all wavelengths other than the desired actuation wavelength is 0.5. The temperature rise at the desired actuation wavelength remains at 100% so the difference is large. However, with four distinct filters, the factor is 0.67. With five, the factor is 0.75. Clearly, as the number of filter materials increases, the difference between apparatus temperature rise at the desired actuation wavelength and the rise at all other wavelengths becomes smaller, which could be a disadvantage. But this approach this approach does allow the use of readily available band-pass filter materials to easily create wavelength-specific notch filters with sets of three, four, or five.

Figure 14:
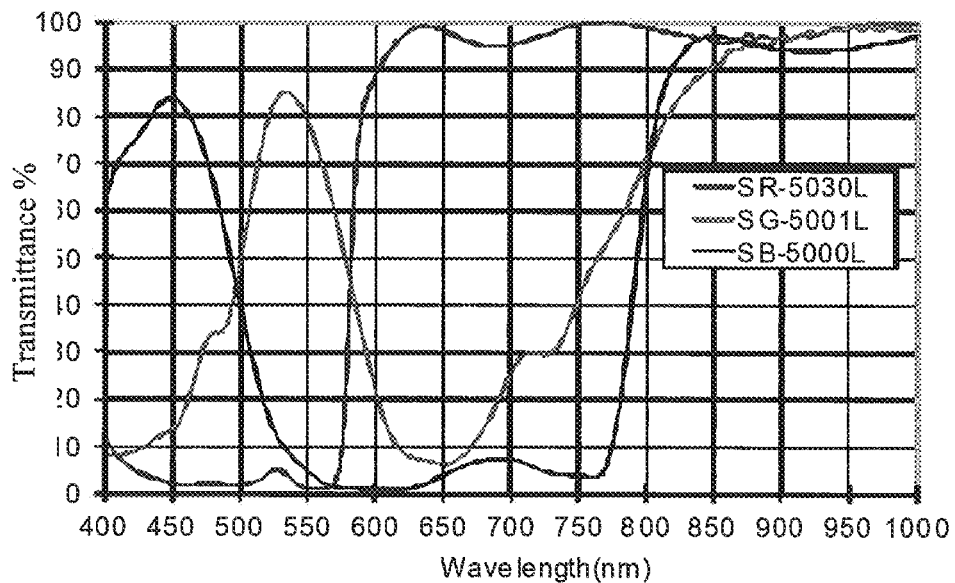

One example of a set of lithographically patternable color filter materials is the Color Mosaic line of products from Fujifilm Electronic Materials. Three measured transmittance curves for blue, green, and red filter materials are shown in FIG. 14.

Figure 15:
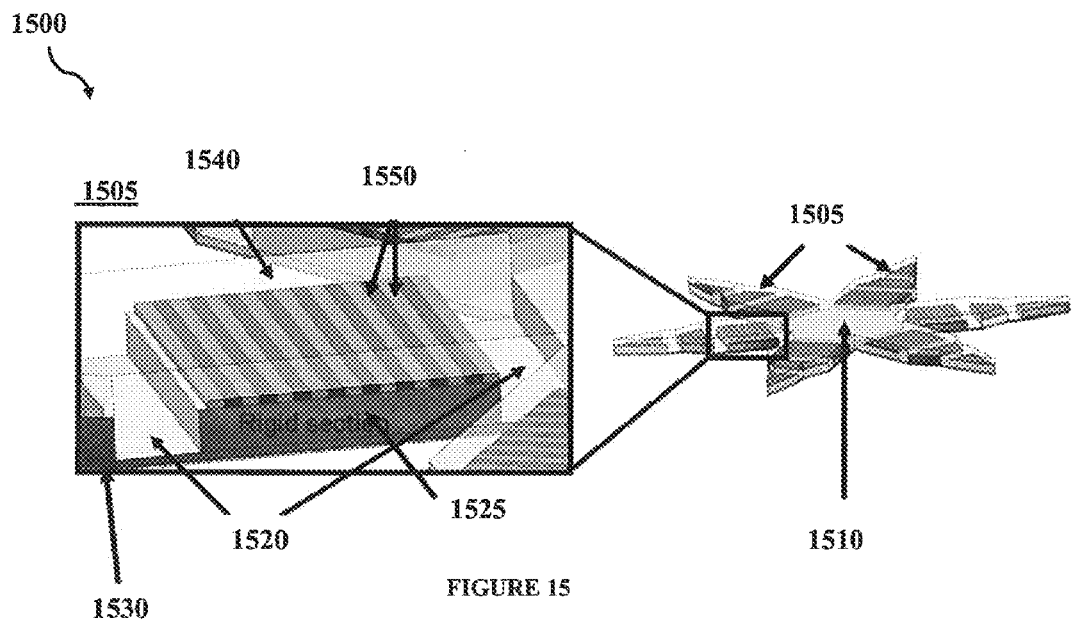
FIG. 15 shows an example of another micro-gripper apparatus according to an embodiment.

FIG. 15 shows an example of a micro-gripper apparatus 1500 according to an embodiment. The device 1500 includes a circular arrangement of micro-gripper arms 1505. Here, the micro-gripper apparatus 1500 includes six micro-gripper arms 1505 arranged around a rigid body portion 1510; although, similar micro-gripper apparatuses can be fabricated have any number of arms and/or configurations. The construction of one of the micro-gripper arms 1505 is further illustrated in the detail pane of the figure and includes hinge sections 1520, rigid sections 1525 and pres-stressed element 1530. By judiciously tailoring the hinge sections 1520 and rigid sections 1525, a device having desired movement potential and degrees-of-freedom can be produced.

As will be appreciated, the micro-gripper arm is an optically actuated mechanical device with the pre-stressed element 1530 and optically-sensitive material 1540 enabling actuation. The micro-gripper arms 1505 can be individually activated or actuated together, for example, by illuminating it with light having a wavelength which the optically-sensitive material 1540 is sensitive to and will optically absorb. Initially, the micro-gripper 1500 is fabricated to be generally planar, but upon actuation, the micro-gripper arms 1505 bend away from the plane of the body 1510. In addition, an absorber layer sites 1550, with the patterned blue/green filter arrangement intended to specifically passes blue and green light and absorbs red light, is provided.

Another major advantage of optically triggered actuation is the high precision achieved by spatial control over folding. By directing an optical source (e.g., a laser beam) at individual hinge sections, it is possible to sequentially fold structures, as might be required in reconfigurable systems or programmable matter, such as described by Hawkes, E., et al. (2010), "Programmable matter by folding," *Proc. Natl. Acad. Sci.* 107(28), 12441-12445, for example.

Figure 16:
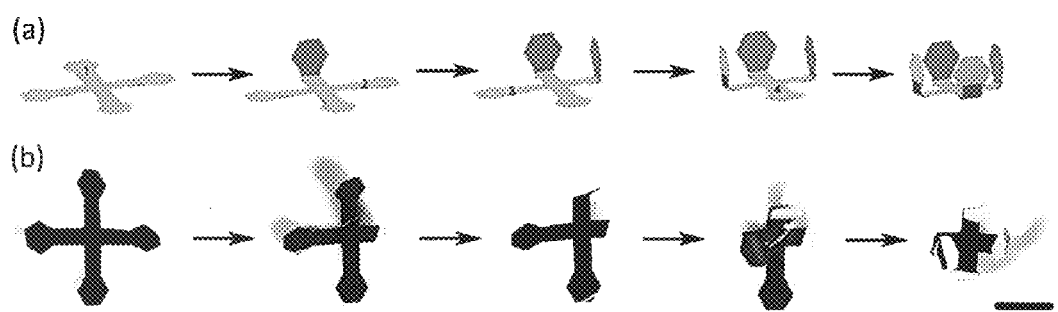

FIG. 16 shows sequentially folding of individual arms of a four-membered structure according to an embodiment. The top row (a) of figures shows schematics of a four-membered structure folded sequentially. The bottom row (b) of figures includes optical microscopy images showing sequential actuation of individual hinges within a single four-membered structure using a 532 nm laser (scale bar is 1 mm). Even though the same optical source was utilized to heat the hinges, it is noteworthy that optical source intensity and wavelength could also be adjusted to control localized heating of spatially separated hinges, such that triggering one hinge does not trigger adjacent hinges, and that different hinges respond to different wavelengths. Optically triggered actuation could also be used to control other geometries such as reconfigurable RF antennas, metamaterials, communication devices, morphing structures and programmable matter.

The nested structures shown may be used to provide spatially sequestered molecules, cells, or chemicals within a single package such as would be required in cascading reactions. Structures with different shapes, pores, or sensors or other electrical circuits could be pre-patterned using basic lithographic techniques, which could then be assembled into complex nested devices. Metallic structures function as micro-Faraday cages and could be used to protect, for instance, highly-sensitive electromagnetic devices from noisy environments.

Figure 17:
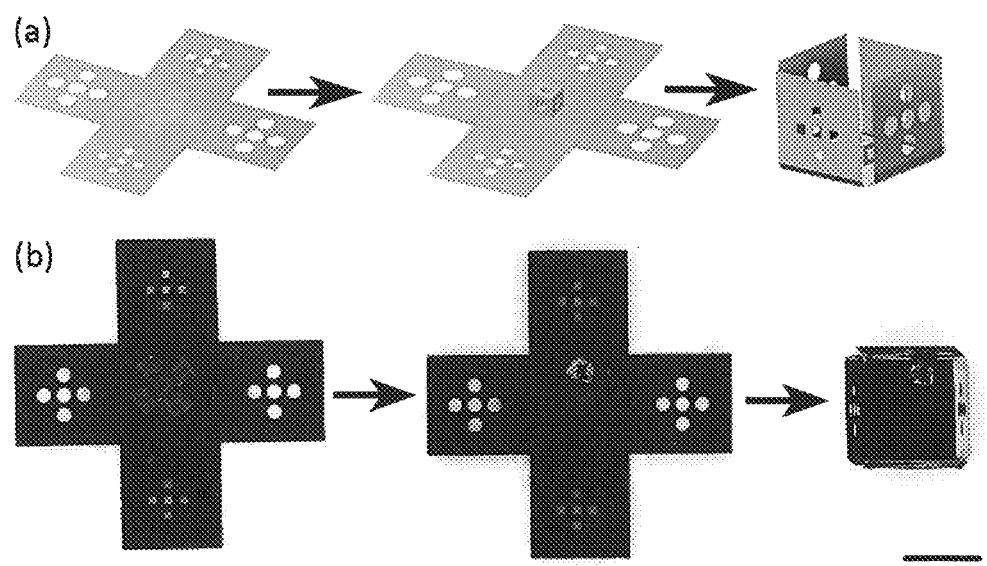

FIG. 17 shows sequentially-folded, nested three-dimensional (3-D) patterned cubes according to an embodiment. The top row (a) of figures shows schematics of two patterned cruciforms folded into nested cubes. The bottom row (b) of figures includes optical microscopy images showing sequential actuation of two patterned cruciforms into nested cubes using a 532 nm laser (scale bar is 1 mm). A small, uniquely patterned cruciform was placed in the interior of a larger patterned cruciform. The 40 mW, 532-nm laser source triggered folding of the smaller cruciform without folding the larger one. The same laser can be used to trigger folding of each face of the larger cruciform around the already folded smaller cube, creating two nested cubes. This high precision demonstration of sequential folding on two size scales highlights considerable user control over the complexity of structures that can be fabricated via laser-triggered actuation with one or more lasers.

Unlike the fully-released, free-standing structures previously-described, substrate mounted optically-actuated structures may also be formed.

FIG. 18 shows a substrate-mounted, optically-actuated electrical switch 1800 according to an embodiment. The optically-actuated switch 1800 is configured to complete an electrical circuit between the line in 1890 and line out 1890. With optical energy, the switch element 1810 of the switch 1800 can be used to switch between electrical "on" and "off" states. For instance, the switch element 1810 may be fabricated according to the previously-discussed optically actuated mechanical devices 10 and 100 embodiments, for instance. To maximize packaging and reduce size of the switch 1800, the switch element 1810 may be located in a cavity 1875 of the switch 1800. One or more display pixels could be modulated between pre-defined states, in order to reflect, shutter, or transmit light in a battery-free, wireless manner. Thus, images, text, or other messages could be changed depending on the intensity and wavelength of light used to irradiate the pixel or pixels. The metallic nature of the device may be used as an electrical switch or as a source of mechanical friction to initiate a propellant or other energetic material, used to propel, power, or fracture a micro-device.

FIG. 19 includes SEM photographs of another optically-actuated mechanical device 1900 according to an embodiment. FIG. 19A) shows the device in an initially flat, unactuated state, whereas FIG. 19B) shows the device in a deployed or actuated state.

The device 1900 could be used as the switch, such as to modulate pixels of a display device between pre-defined reflection, shuttering, or transmission states of light in a battery-free, wireless manner. And, in yet another embodiment, the micro-gripper arms of the device 1900 could be configured to curl and rupture a substrate-mounted capsule or other sealed container, for example, containing microencapsulated chemiluminescent particles. The device 1900 may be used to provide mobility to a microrobotic platform. The apparatus might alternatively be used as an electrical switch to efficiently and wirelessly turn on or off a circuit in an untethered microdevice.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

All patents, patent applications, articles and other references mentioned herein are hereby incorporated by reference in their entireties.

We claim:

1. An optically-actuated mechanical device comprising:
at least one deformable section formed of:
an element including an intrinsic stress differential or gradient, said stress tending to urge deformation of one portion relative to another portion; and
an optically-sensitive material which is configured to (i) initially prevent deformation of the device, and (ii) upon sufficient heating by absorbing optical energy allows the element to deform.

2. The device according to claim 1, wherein the element comprises a single layer having a surface treatment to create residual stress in the element.

3. The device according to claim 1, wherein the element comprises a multilayer structure formed of at least two layers having different levels of residual stress to create residual stress in the element.

4. The device according to claim 1, wherein the optically-sensitive material comprises 1) an optically-sensitive polymer which, by absorbing optical energy, softens, and/or 2) a thermally-sensitive shape memory alloy (SMA) which, by absorbing optical energy, heats above its transition temperature causing it to deform.

5. The device according to claim 4, where the optically-sensitive polymer is configured to soften with light of a pre-determined wavelength.

6. The device according to claim 4, wherein the SMA comprises a Nitinol alloy.

7. The device according to claim 1, further comprising an optically-absorbing material which, by absorbing optical energy, heats and conductively transfers heat to a thermally-sensitive material.

8. The device according to claim 7, wherein the optically-absorbing material comprises an optical band-pass filter configured to selectively absorb a specific wavelength.

9. The device according to claim 1, wherein further comprising one or more rigid elements to prevent deformation of the device where provided.

10. The device according to claim 4, comprising both 1) an optically-sensitive polymer which, by absorbing optical energy, softens, and 2) a thermally-sensitive shape memory alloy (SMA) which, by absorbing optical energy, heats above its transition temperature causing it to deform,
wherein the optically-sensitive polymer is configured to absorb optical energy and, softens thus permitting the device to deform; and
the SMA alloy is configured to absorb optical energy causing to device to transition back to its initial state.

11. The device according to claim 1, wherein upon cooling, the optically-sensitive material maintains its configuration.

12. The device according to claim 1, further comprising a substrate which is at least partially releasable and once released permits the element to deform.

13. The device according to claim 1, wherein there is a plurality of optically absorbing materials which are configured to absorb light at different wavelengths.

14. The device according to claim 1, wherein enables non-reversible or reversible mechanical actuation.

15. A micro-gripper apparatus having at least one deformable arm comprising the optically-actuated mechanical device of claim 1.

16. The micro-gripper apparatus according to claim 15, wherein the apparatus comprise a body portion and a plurality of arms provided in a circular arrangement about the body.

17. A switch comprising the optically-actuated mechanical device of claim 1.

18. The switch according to claim 17, wherein the switch is an electrical switch configured to open/close a circuit or a mechanical switch configured to rupture a capsule.

19. A method for fabricating one or more optically-actuated mechanical device according to claim 1, comprising:
depositing material forming one or more element of the one or more device on a substrate;
patterning to define rigid sections and deformable sections of the one or more device;
applying optically-sensitive material at a least the deformable sections of the one or more devices; and
at least partially releasing the one or more devices from the substrate.

20. A method for actuating an optically-actuated mechanical device according to claim 1, comprising:
applying optical energy to the device to actuate the device.

21. The method according to claim 20, where the optical energy has a wavelength between about 1.4 and 1.8 µm.

22. The method according to claim 20, where the optical energy has a wavelength between about 450 and 680 nm.

* * * * *